(12) United States Patent
White et al.

(10) Patent No.: US 10,193,246 B1
(45) Date of Patent: Jan. 29, 2019

(54) MULTIPURPOSE SOCKET FOR ELECTRICAL UTILITY REPAIR APPLICATION

(71) Applicants: James Tyler White, Victor, WV (US); Shlomo Ben-Efraim, Las Vegas, NV (US)

(72) Inventors: James Tyler White, Victor, WV (US); Shlomo Ben-Efraim, Las Vegas, NV (US)

( * ) Notice: Subject to any disclaimer, the term of this patent is extended or adjusted under 35 U.S.C. 154(b) by 0 days.

(21) Appl. No.: 15/703,984

(22) Filed: Sep. 14, 2017

(51) Int. Cl.
| | |
|---|---|
| *B25B 23/16* | (2006.01) |
| *H01R 11/14* | (2006.01) |
| *H01R 31/08* | (2006.01) |
| *H02G 1/14* | (2006.01) |
| *H01R 4/44* | (2006.01) |
| *H01R 4/36* | (2006.01) |

(52) U.S. Cl.
CPC .............. *H01R 11/14* (2013.01); *H01R 4/36* (2013.01); *H01R 4/44* (2013.01); *H01R 31/08* (2013.01); *H02G 1/14* (2013.01)

(58) Field of Classification Search
CPC ................................................ B25B 13/5091
USPC .................... 439/479, 480; 81/53.1; 294/174
See application file for complete search history.

(56) References Cited

U.S. PATENT DOCUMENTS

| | | | | | |
|---|---|---|---|---|---|
| 1,223,791 | A | * | 4/1917 | Jackson ................ | H01R 11/14 294/174 |
| 1,603,035 | A | * | 10/1926 | Evans .................... | H01R 11/14 439/479 |
| 1,744,356 | A | * | 1/1930 | Bodendieck ........... | H01R 11/15 294/174 |
| 1,920,168 | A | * | 8/1933 | Bodendieck ............ | B23P 19/00 81/53.1 |
| 2,099,921 | A | * | 11/1937 | Becker ................ | B25B 13/5091 81/53.1 |
| 2,194,411 | A | * | 3/1940 | Tipsord .................. | B25B 27/00 81/3.8 |
| 2,304,807 | A | * | 12/1942 | Donoghue ............. | H01R 11/15 439/803 |
| 4,132,441 | A | * | 1/1979 | Watkins ............ | H01H 85/0208 294/174 |
| 6,875,917 | B1 | * | 4/2005 | Wood ...................... | H02G 1/02 174/38 |
| 7,160,142 | B2 | * | 1/2007 | Hughes .................. | H01R 11/14 439/478 |
| 7,909,376 | B1 | * | 3/2011 | McKinley ............ | H01H 31/006 294/174 |
| 8,056,445 | B2 | * | 11/2011 | Jackson ............. | B25B 13/5091 81/487 |

\* cited by examiner

*Primary Examiner* — Neil Abrams
(74) *Attorney, Agent, or Firm* — Steven Rinehart

(57) ABSTRACT

A socket for mating with the eyelet of a hot line clamp, an eye nut, an eye bolt, and a wing nut, the socket defining two slots for straddling and axially-rotating a bolt of the hot line clamp to tighten or loosen the hotline clamp.

7 Claims, 7 Drawing Sheets

MULTIPURPOSE SOCKET FOR ELECTRICAL UTILITY REPAIR APPLICATION

FIELD OF THE INVENTION

This invention relates to hot line clamps, and more particularly relates to a detachable socket for engaging a hot line clamp, an eye bolt, an eye nut, wing nuts and the like during high-voltage electrical line repair applications.

BACKGROUND

Description of the Related Art

Hot tie clamps are known to the art for suppressing electrical power to a line which must be severed by a lineman and for grounding electrical power distribution lines during repair and installation operations. Latching hot tie clamps of the type herein taught have commonly been mounted at an end of an elongate insulative rod, known in the industry as a "hot stick," and raised for connection onto the power line.

Typical hot tie clamps comprise a stirrup which is placed over the power line and typically also includes a rotatable threaded rod or bolt having an eyelet at a distal end and a gripping jaw at an upper proximal end. The bolt and eyelet held in a hollow upper portion of the hot stick as the grounding equipment is raised to the power line and the stirrup placed on the power line. The bolt and eyelet are released from the hot stick and a hook at an upper end of the hot stick used to engage the eyelet and rotate it by hand, moving the bolt inwardly, as long as the hook engagement with the eyelet was maintained. Rotation was continued until the gripping jaw firmly held the power line in place in the stirrup.

This method of tightening the bolt is fraught with shortcoming and inefficiencies, including the time and strength necessary to tighten bolts repeatedly by lineman. There existed no efficient means of automatically tightening or loosening a bolt.

In use of the hot stick becomes untenable when the power lines extend in directions other than horizontally. With power lines in non-horizontal planes, it is difficult to thread the bolt with the hot stick. Manipulation and rotation of the bolt has always been cumbersome and awkward.

Socket wrenches have also long been known in the art particularly in automotive repair applications. Extensions and adapters are available which can be combined with sockets in a variety of configurations to reach some distance. Sockets for tightening and loosening hot line clamps are unknown and needed in the art. It would likewise be advantageous to provide a socket useful for engaging an eye nut, a wing nut, and the like.

The present invention is designed to overcome these shortcomings and to ensure that hot tie clamps, nuts, and bolts can more easily and efficiently be manipulated by lineman.

SUMMARY

From the foregoing discussion, it should be apparent that a need exists for a hot line clamp socket. Beneficially, such an apparatus would be adapted to tighten and loosen the bolt of a hot line clamp automatically as well as other nuts and bolts commonly-used by lineman.

The present invention has been developed in response to the present state of the art, and in particular, in response to the problems and needs in the art that have not yet been fully solved by currently available firearm projectiles and shotgun slugs. Accordingly, the present invention has been developed to provide a socket for engaging a bolt of a hot line clamp, the socket comprising: a socket comprising a cylindrical socket body having an open top end and an open bottom end, the open bottom end having a square inner surface for mating with a drill; two upwardly protruding diametrically-opposed protuberances for straddling and mating with an eyelet of a hot line clamp, the eyelet sharing a common axis with the socket; wherein the socket is adapted to rotate axially to tighten a line clamp. In other embodiments, the socket is adapted to rotate axially to loosen a line clamp.

The upwardly protuberances and cylindrical body may be formed as a single integrated piece. The upwardly protruding sidewalls may be arcuate through a cross section.

The upwardly protruding sidewalls may define a hexagonal interior recess.

A second socket for engaging a bolt of a hot line clamp is provided, the socket comprising: a socket comprising a cylindrical socket body having an open top end and an open bottom end, the open bottom end having a square inner surface for mating with a drill; wherein the open top end is notched to define two diametrically-opposed downwardly-traversing slots interrupting an annular open top end, the slots for receiving an eyelet of a hot line clamp, the eyelet sharing a common axis with the socket; wherein the socket is adapted to rotate axially to tighten a line clamp.

The open top end may define a hexagonal interior recess.

Further objects and advantages of this invention will become apparent from the following description referring to the accompanying drawing, and the features of novelty which characterize this invention will be pointed out with particularity in the claims appended to and forming a part of this specification.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples are meant to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
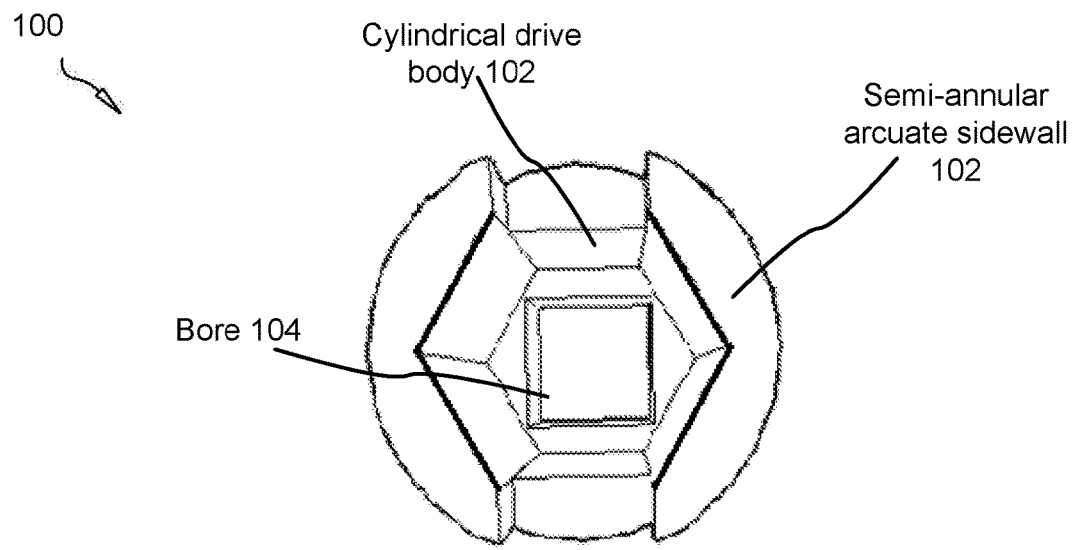
FIG. 1A is a top perspective view illustrating one embodiment of a hot line clamp socket in accordance with the present invention.

FIG. 1A is a top perspective view illustrating one embodiment of a hot line clamp socket 100 in accordance with the present invention.

The socket 100 comprises a cylindrical drive body 102 defining a hollow interior recess, passageway or cavity. The cylindrical drive body 102 comprises a tubular sleeve adapted to mate with both a detent, socket wrench or drill at it bottom or distal end.

The open bottom end defines a square inner surface or aperture for engaging a corresponding male component of a socket wrench or drill. In other embodiments, the open bottom end may define a hexagonal interior surface.

The cylindrical drive body 102 defines an open top end which may be considered serrated at diametrically-opposed points. In other aspects, two protuberances, or semi-annular arcuate sidewalls 102, protrude upwardly from the open top end for straddling and engaging an eyelet on a hot line clamp.

The open top end may comprise alternative and/or additional geometric designs and/or utilize a "point" system for socket and/or for the interior recess. The interior recess may be hexagonal in shape or may be adapted to couple to 6-point or 12-point sockets, or various other species of sockets known to those of skill in the art. The present invention may include any of the features taught herein to make the apparatus 100 more usable in its application.

The socket 100 mates with the eyelet on the bolt of a hot line clamp and turns the bolt axially of the hot line clamp around a common central axis. In this manner, the socket is used in connection with a pneumatically-powered drill to tighten or loosen a hot line clamp.

Figure 1B:
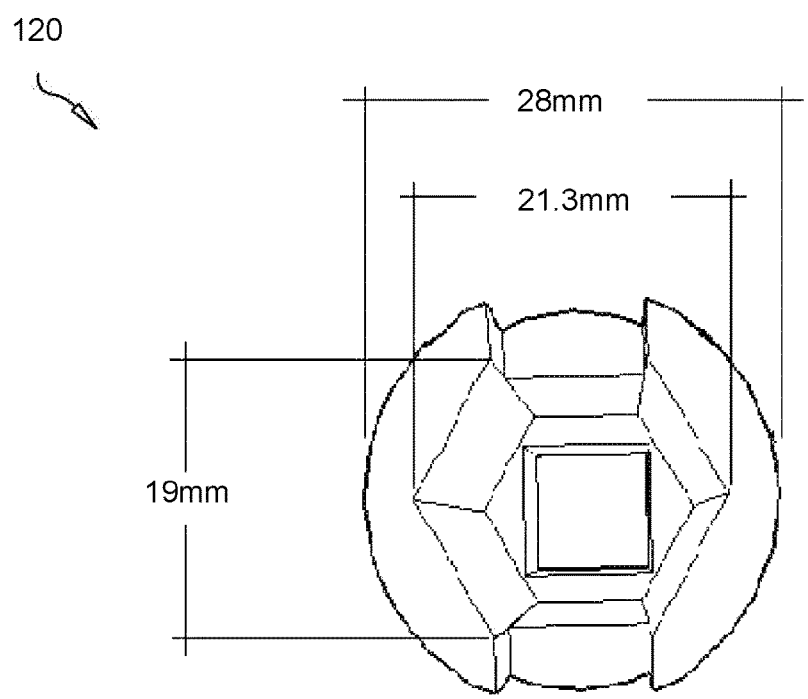
FIG. 1B is a top perspective view illustrating one embodiment of a hot line clamp socket in accordance with the present invention.

FIG. 1B is a top perspective view illustrating one embodiment of a hot line clamp socket 200 in accordance with the present invention.

Figure 2:
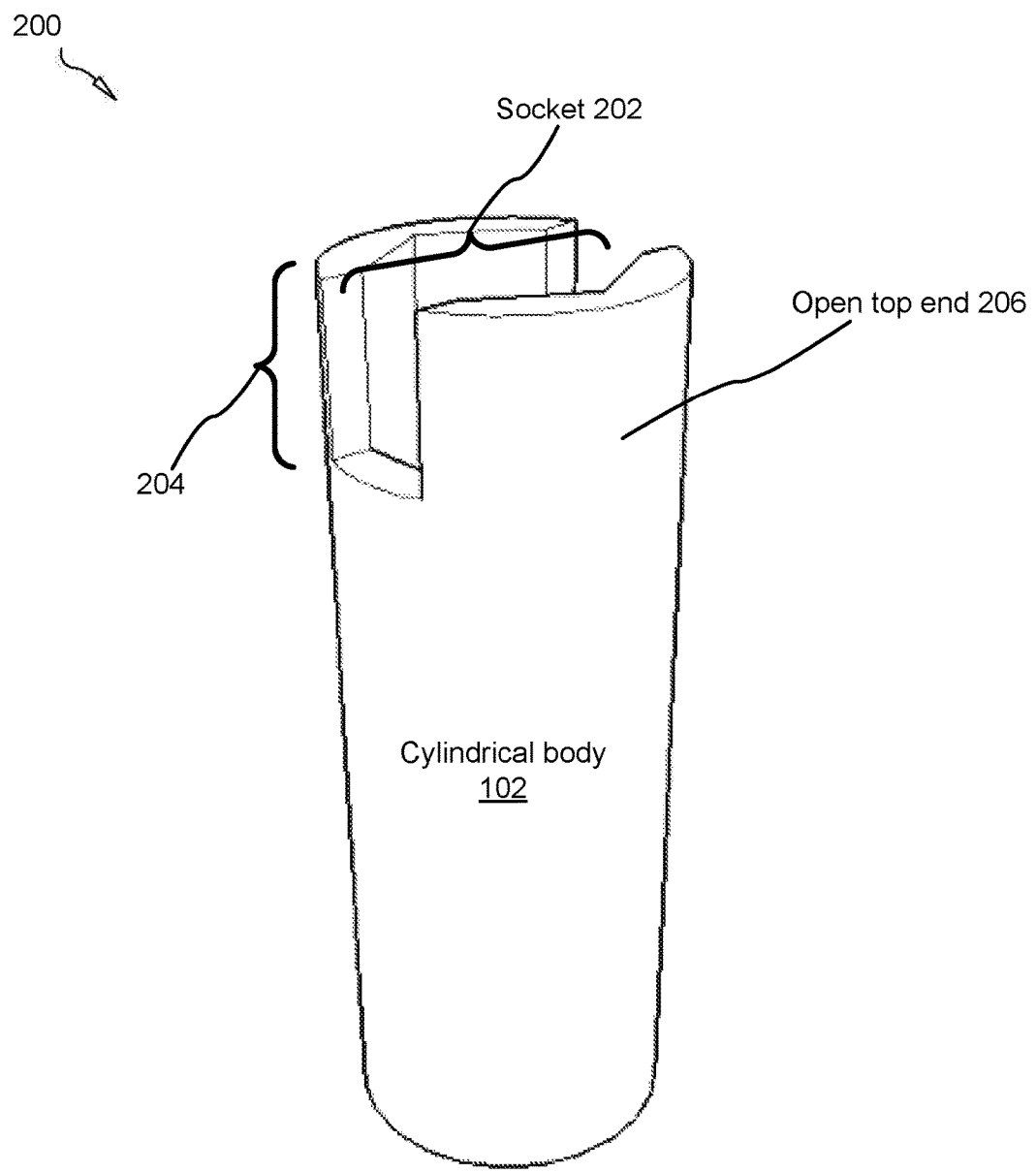
FIG. 2 is a top side perspective view illustrating one embodiment of a hot line clamp socket in accordance with the present invention.

FIG. 2 is a top side perspective view illustrating one embodiment of a hot line clamp socket 120 in accordance with the present invention.

The socket may be dimensioned as shown, being 28 millimeters in diameter and defining a hexagonal interior recess 19 millimeters in diameter.

As shown, the cylindrical body 202 is notched to define two slots 202 extending downwardly from the open top end 206. These slots receive the eyelet of a hot line clamp and facilitate the axial rotation of the bolt thereof.

Figure 3A:
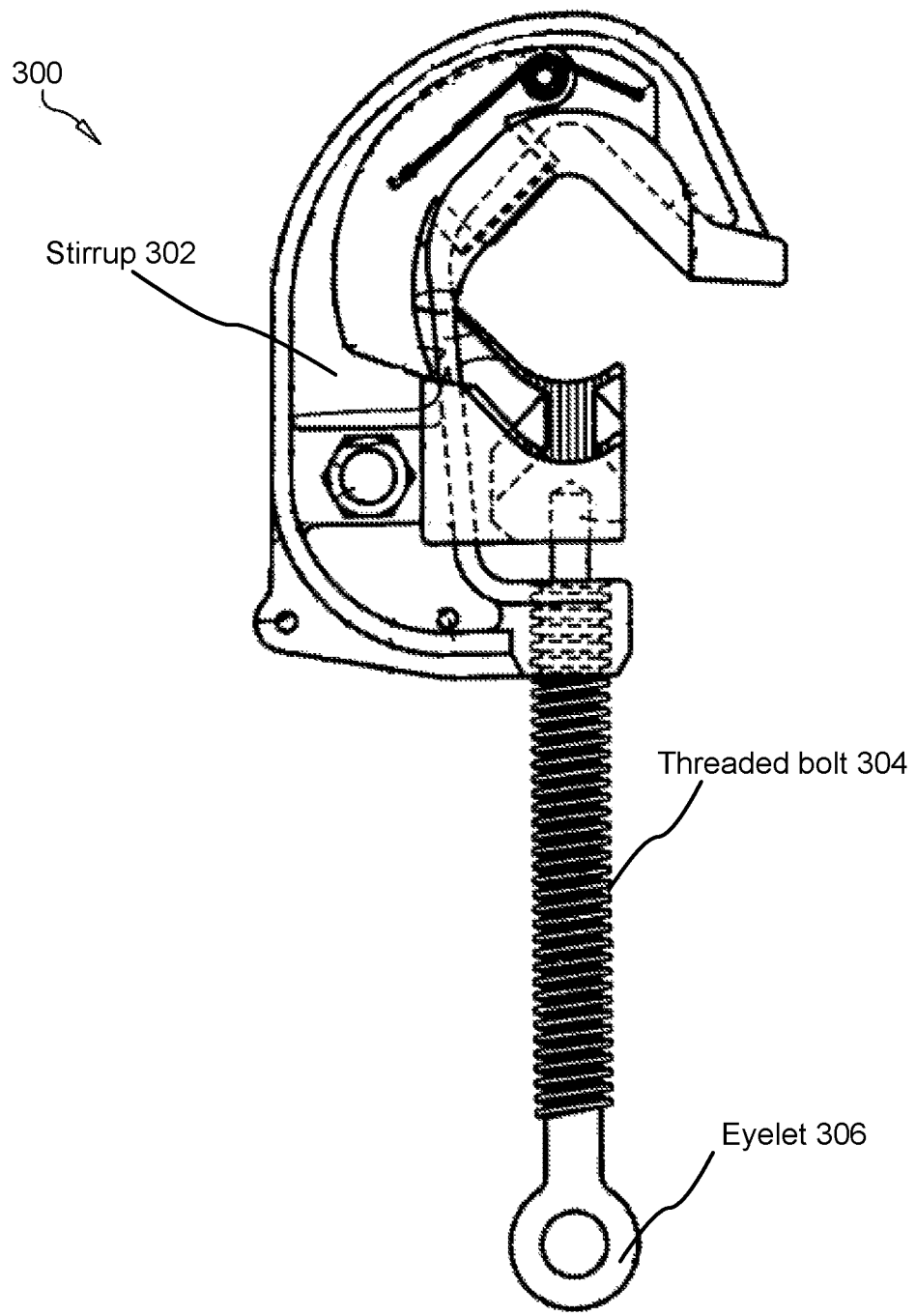
FIG. 3A is a side perspective view illustrating a traditional hot line clamp in accordance with the prior art.

FIG. 3A is a side perspective view illustrating a traditional hot line clamp in accordance with the prior art.

A traditional hot line clamp includes a stirrup 302 and a threaded bolt 304 for clamping down on an electrical power line. The threaded bolt 304 terminates with an eyelet 306 which is traditionally rotates by a hot stick in the hands of a lineman.

Figure 3B:
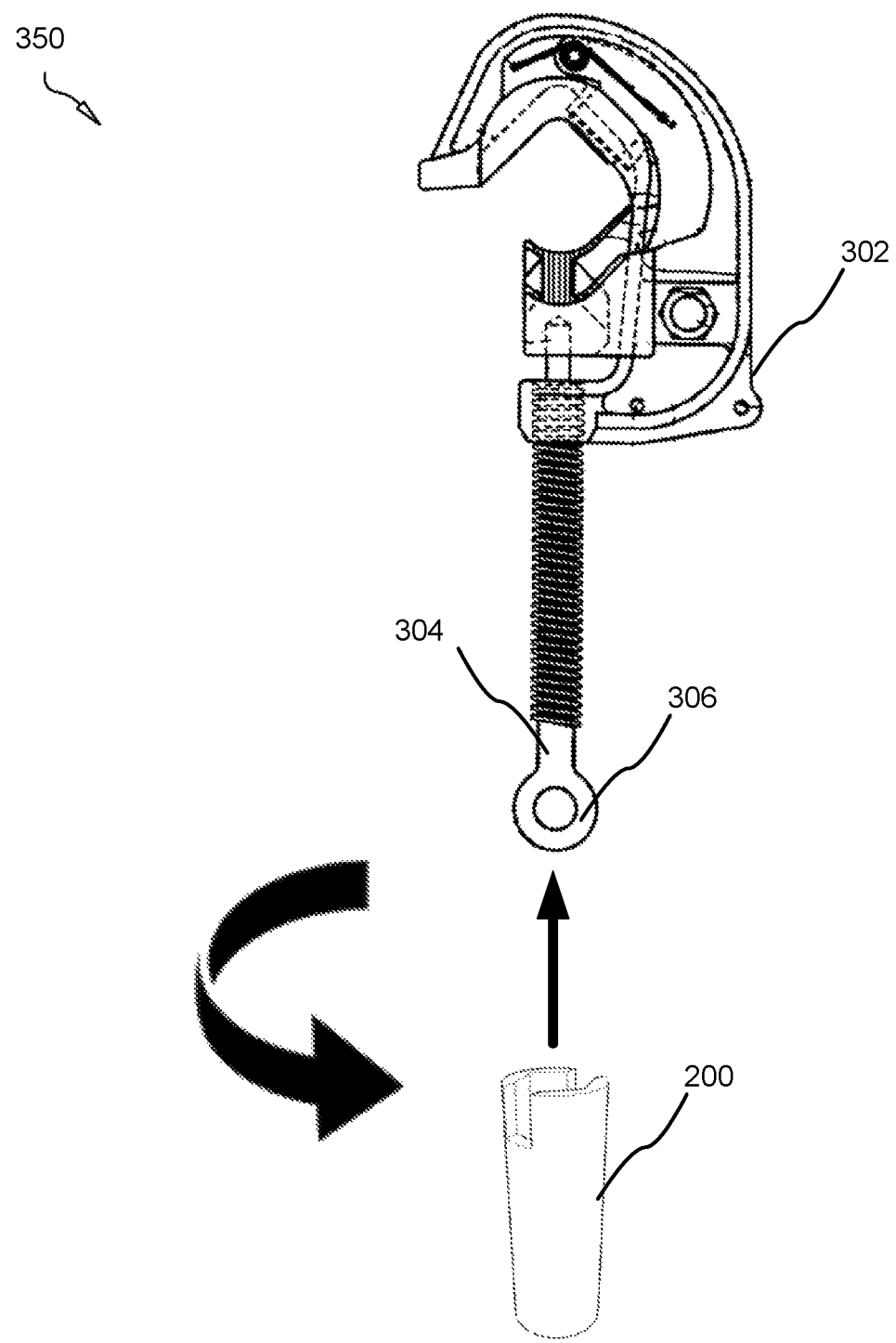
FIG. 3B is a top side perspective view illustrating a hot line clamp and one embodiment of a hot line clamp socket in accordance with the present invention.

FIG. 3B is a top side perspective view illustrating a hot line clamp and one embodiment of a hot line clamp socket in accordance with the present invention.

The socket 200 of the present invention engages and mates with the eyelet 306 of the bolt 304 of the hot line clamp 300. The eyelet 306 fixes within the slots defined by the socket 200 with apply torque to the bolt 304.

Figure 4A:
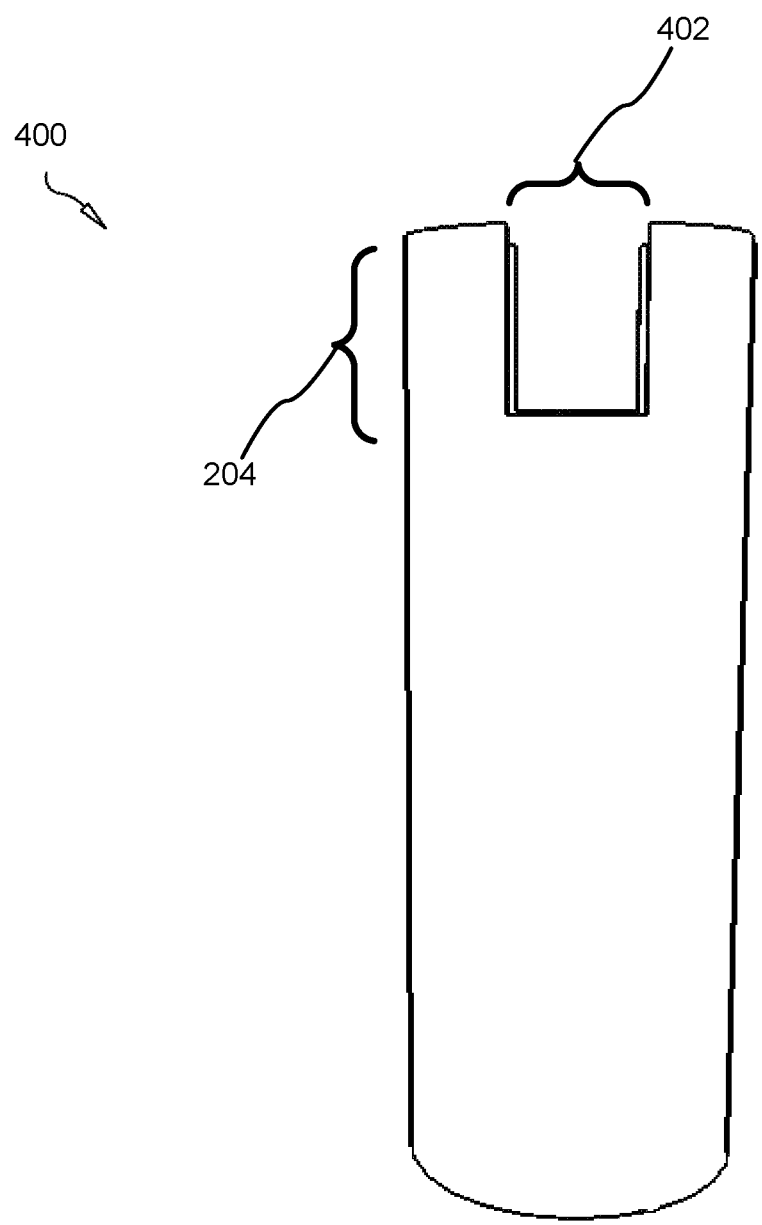
FIG. 4A is a side perspective view illustrating one embodiment of a hot line clamp socket in accordance with the present invention.

FIG. 4A is a side perspective view illustrating one embodiment of a hot line clamp socket in accordance with the present invention.

The slots 402 defined by the notched open top end are shown. These slot was span 3 millimeters to more than 30 millimeters in width.

Figure 4B:
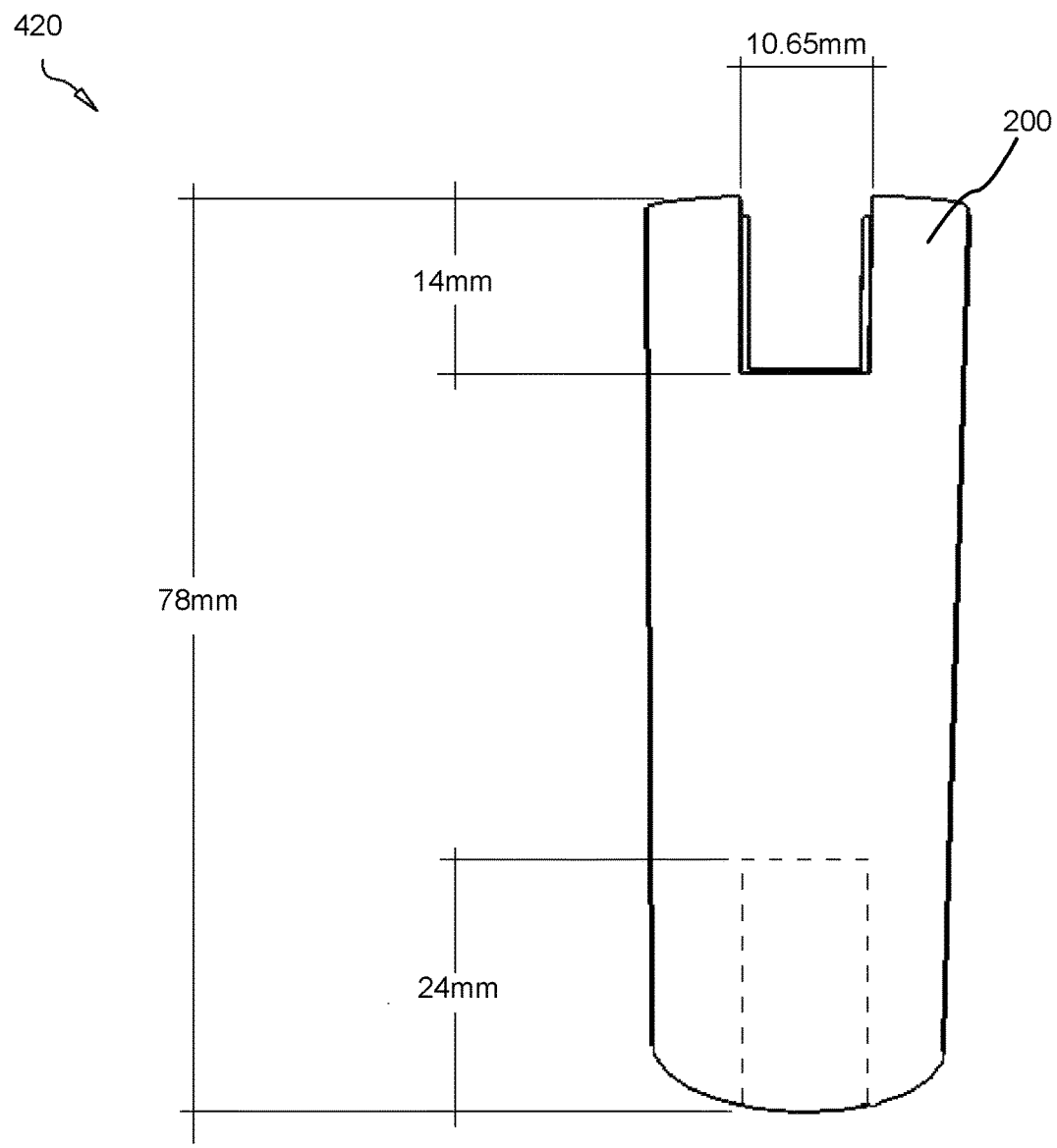
FIG. 4B is a side perspective view illustrating one embodiment of a hot line clamp socket in accordance with the present invention.

FIG. 4B is a side perspective view illustrating one embodiment of a hot line clamp socket in accordance with the present invention.

The socket 200 may be dimensioned as shown with the slots 402 being 14 millimeters in height. The cylindrical socket body may be 78 millimeters in heights.

Figure 5A:
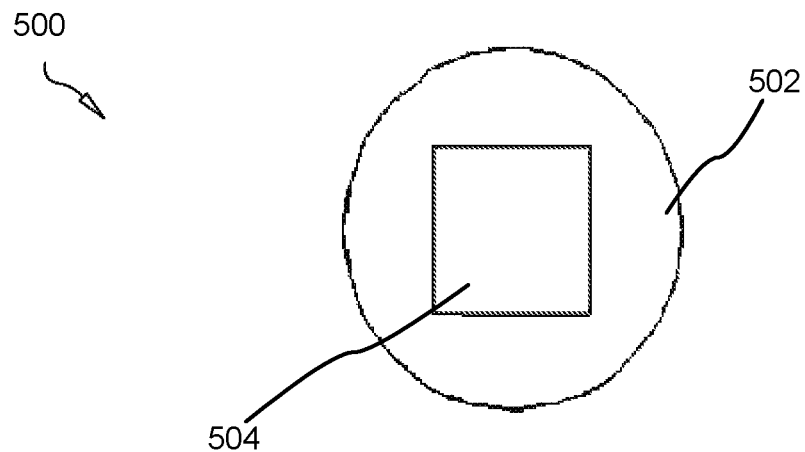
FIG. 5A is a top perspective view illustrating one embodiment of a hot line clamp socket in accordance with the present invention.

FIG. 5A is a top perspective view illustrating one embodiment of a hot line clamp socket in accordance with the present invention.

The open bottom end 502 may define a square interior recess for mating with a drill as shown. Alternatively, the open bottom recess may define a hexagonal or irregularly-shaped interior recess. In other embodiments, the bottom end of the socket 500 is otherwise-shaped to mater with a drill as a bit.

Figure 5B:
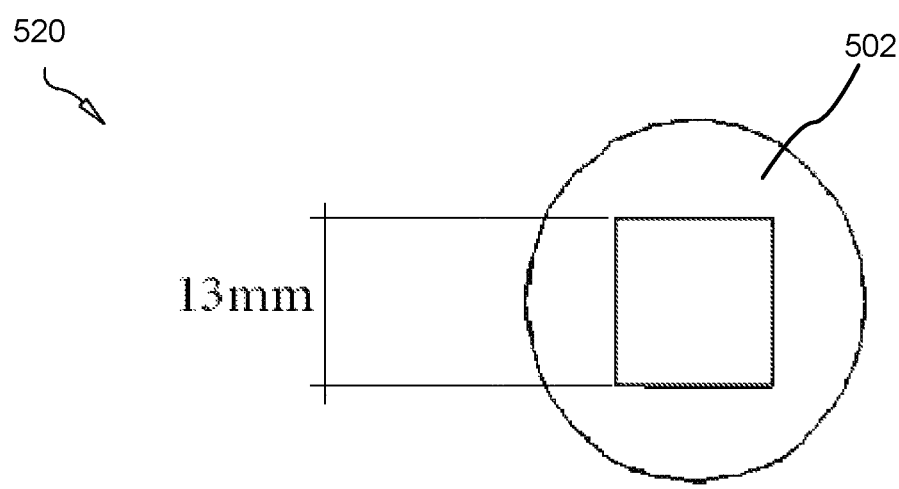
FIG. 5B is a top perspective view illustrating one embodiment of a hot line clamp socket in accordance with the present invention.

FIG. 5B is a top perspective view illustrating one embodiment of a hot line clamp socket in accordance with the present invention.

The open bottom end may be dimensioned as shown.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A socket for engaging a bolt of a hot line clamp, the socket comprising:
    a socket comprising a cylindrical socket body having an open top end and an open bottom end, the open bottom end having a square inner surface for mating with a drill;
    two upwardly protruding diametrically-opposed protuberances for straddling and mating with an eyelet of a hot line clamp, the eyelet sharing a common axis with the socket;
    wherein the socket is adapted to rotate axially to tighten a line clamp.

2. The socket of claim 1, wherein the upwardly protuberances and cylindrical body are formed as a single integrated piece.

3. The socket of claim 1, wherein the upwardly protruding sidewalls are arcuate through a cross section.

4. The semitrailer of claim 1, wherein the upwardly protruding sidewalls define a hexagonal interior recess.

5. The semitrailer of claim 1, wherein the socket is adapted to rotate axially to loosen a line clamp.

6. A socket for engaging a bolt of a hot line clamp, the socket comprising:
    a socket comprising a cylindrical socket body having an open top end and an open bottom end, the open bottom end having a square inner surface for mating with a drill;
    wherein the open top end is notched to define two diametrically-opposed downwardly-traversing slots interrupting an annular open top end, the slots for receiving an eyelet of a hot line clamp, the eyelet sharing a common axis with the socket;
    wherein the socket is adapted to rotate axially to tighten a line clamp.

7. The socket of claim 1, wherein the open top end defines a hexagonal interior recess.

* * * * *